United States Patent [19]

Hegarty et al.

[11] Patent Number: 4,762,384
[45] Date of Patent: Aug. 9, 1988

[54] OPTICAL SYSTEMS WITH ANTIRECIPROCAL POLARIZATION ROTATORS

[75] Inventors: John Hegarty, Plainfield; Raymond Wolfe, New Providence, both of N.J.

[73] Assignee: American Telephone and Telegraph Company, AT&T Bell Laboratories, Murray Hill, N.J.

[21] Appl. No.: 771,016

[22] Filed: Aug. 30, 1985

Related U.S. Application Data

[63] Continuation-in-part of Ser. No. 728,669, Apr. 29, 1985, Pat. No. 4,671,621.

[51] Int. Cl.⁴ .......................... G02B 6/10; G02B 27/00
[52] U.S. Cl. ................................ 350/96.12; 350/374; 350/403; 350/406
[58] Field of Search ............ 350/406, 370, 374, 96.12, 350/375, 377, 400, 403

[56] References Cited

U.S. PATENT DOCUMENTS

| | | | |
|---|---|---|---|
| 3,617,942 | 11/1971 | Kurtzig et al. | 350/151 X |
| 3,764,195 | 10/1973 | Blank et al. | 350/377 |
| 3,845,477 | 10/1974 | Le Craw et al. | 365/15 X |

OTHER PUBLICATIONS

Tien, P. K., "Light Waves in Thin Films and Integrated Optics" *App. Optics*, vol. 10, p. 2395, 1971.
Tien, P. K. "Switching and Modulation of Light in Magneto-Optic Waveguide Garnet Films", *App. Physics*, LTRS, vol. 21, No. 8, pp. 394–396, Oct. 15, 1972.
Stolen et al., "Faraday Rotation in Highly Birefringent Optical Fibers", Applied Optics, vol. 19, No. 6, Mar. 1980, pp. 842–845.
"Optical TE-TM Mode Conversion in Double Epitaxial Garnet Waveguide", A. Shibukawa et al., *Applied Optics*, vol. 20, No. 14, Jul. 15, 1981, pp. 2444–2450.

*Primary Examiner*—Bruce Y. Arnold
*Attorney, Agent, or Firm*—Bernard Tiegerman

[57] ABSTRACT

An optical system, e.g., an optical fiber communication system or an optical mass storage device, which includes a linearly birefringent polarization rotator useful in an optical isolator or optical circulator, is disclosed. The rotator, which compensates for the effects of linear birefringence and is substantially antireciprocal, includes two or more material regions which are capable of subjecting incident light to elliptic birefringences. However, the sign and/or magnitude of the linear, or the sign and/or magnitude of the circular, components of the elliptic birefringences differ from region to region. Moreover, the length of each region, except the first or last region, is substantially equal to one-half the birefringent period of the region. The length of the first or last region, by contrast, is substantially equal to one-quarter the birefringent period of the region.

14 Claims, 10 Drawing Sheets

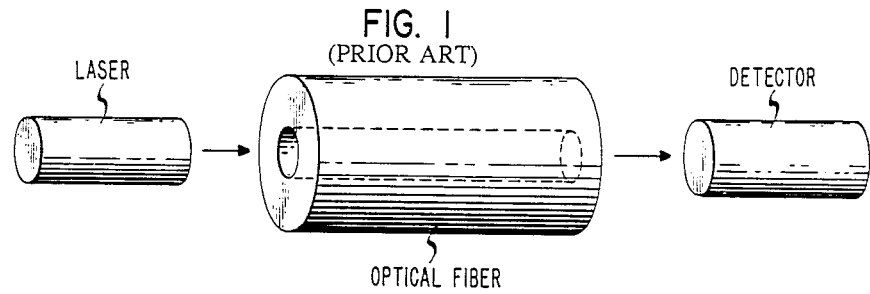
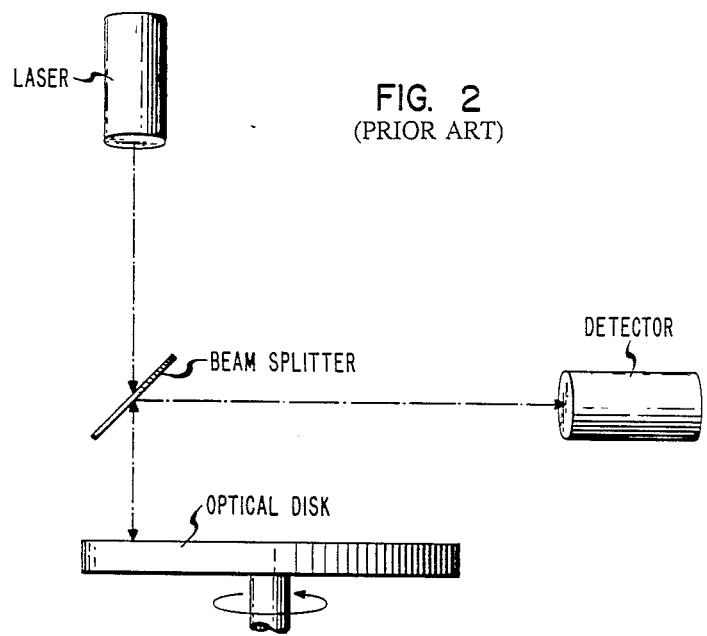

OPTICAL SYSTEMS WITH ANTIRECIPROCAL POLARIZATION ROTATORS

CROSS-REFERENCE TO RELATED APPLICATION

This is a continuation-in-part of application Ser. No. 728,669 filed by J. F. Dillon, Jr., J. Hegarty, and R. Wolfe on Apr. 29, 1985 now U.S. Pat. No. 4,671,621.

BACKGROUND OF THE INVENTION

1. Field of the Invention

The invention pertains generally to optical systems, e.g., optical fiber communication systems and optical mass storage devices, and more particularly to optical systems having antireciprocal polarization rotators.

2. Art Background

Optical systems for communicating and storing information are known and are now commercially significant. For example, an optical communication system, as schematically depicted in FIG. 1, typically includes a semiconductor laser which emits a light signal, e.g., an information-carrying light signal, to an optical fiber, which transmits the light signal to a photodetector. An optical mass storage device, as schematically depicted in FIG. 2, typically includes an optical disk which is capable of being, or has been, processed to store information. This information is encoded onto the disk (through processing) as regions of different optical properties, e.g., different optical reflectivity. The disk is read, i.e., the information stored on the disk is detected, by shining light from a light source, e.g., a semiconductor laser (typically through a beam splitter), onto the disk. The light reflected from the disk is then directed (i.e., reflected by the beam splitter) to a photodetector. Alternatively, the light transmitted by the disk is directed to a photodetector.

In a wide variety of optical systems, devices that rotate the polarization of linearly polarized light in the same sense irrespective of traversal direction are advantageously included. For example, the frequency and power intensity spectra of the light emitted by the semiconductor lasers employed in optical systems are altered when reflected light impinges upon the lasers. Such alterations are undesirable because they lead to errors in the detected information. Thus, efforts have been made to develop devices, called optical isolators, for isolating the semiconductor lasers from reflected light. An optical isolator based on rotation of linearly polarized light is exemplified, as depicted in FIG. 3, by a bulk magnetic garnet material, e.g., bulk single crystal yttrium iron garnet ($Y_3Fe_5O_{12}$, called YIG) material, positioned between a polarizer and an analyzer. This optical isolator has been proposed for use with optical fiber communication systems operating at a wavelength of about 1.3 $\mu$m because single crystal YIG is substantially transparent (at least 50 percent of the incident light is transmitted) at infrared wavelengths (wavelengths ranging from about 0.8 $\mu$m to about 6 $\mu$m). In operation, a magnet is employed to magnetize the YIG (in the direction of light propagation). Linearly polarized light emitted by a laser and transmitted by the polarizer is directed into the YIG material. Under the influence of the net magnetic moment within the (magnetized) material, the linearly polarized light experiences circular birefringence. (In a bulk material, e.g., bulk single crystal YIG, linearly polarized light may be represented as consisting of right- and left-circularly polarized components. Circular birefringence means the two components see different indices of refraction, resulting in one of these components propagating through the material at a faster speed than the other.) As a consequence, the light remains linearly polarized, but the polarization direction is continuously rotated in either the clockwise or counterclockwise (as viewed in FIG. 3) direction as the light traverses the material. (This phenomenon, commonly referred to as the Faraday Effect or magneto-optical rotation, is described in, for example, the *McGraw Hill Encyclopedia on Science and Technology*, 5th edition, Vol. 5 (McGraw Hill, 1982), page 314.) If the material is of appropriate dimension, the light is rotated through, for example, 45 degrees and is thus transmitted by an appropriately oriented analyzer. Reflected light transmitted by the analyzer also enters the YIG material and also undergoes a rotation of 45 degrees in the same direction as the light which originally traversed the material. Consequently, reflected light, after traversing the YIG material, is oriented at 90 degrees to the polarizer, and is thus precluded from impinging upon the laser. (The phenomenon by which a magnetized material rotates both forward and backward propagating linearly polarized light by 45 degrees (or an odd multiple of 45 degrees) in the same direction is denoted antireciprocal magneto-optical rotation. Devices which include such materials are referred to as antireciprocal devices.)

A second type of device based on rotation of linearly polarized light is a circulator. Such a device as employed, for example, in an optical communication system efficiently couples light signals from a semiconductor laser into one end of an optical fiber, and allows detection of counterpropagating light signals emanating from the same fiber end. One type of optical circulator (having a configuration suitable for efficiently coupling light into and out of an optical fiber end) is depicted in FIG. 4. This circulator, like the exemplary isolator, includes bulk single crystal YIG, and also includes a polarization sensitive reflector. In operation, a magnet is used to magnetize the YIG in the direction of light propagation. Linearly polarized light, e.g., horizontally (as viewed in FIG. 4) linearly polarized light, emanating from the optical fiber end, is directed into the magnetized YIG. (The optical fiber is, for example, a polarization preserving fiber. Alternatively, an appropriately oriented polarizer is positioned between a non-polarization-preserving fiber and the YIG.) If the YIG is of appropriate dimension, the light is rotated through, for example, 45 degrees (in the clockwise direction, as viewed from the fiber in FIG. 4) and is transmitted by the polarization sensitive reflector to a detector. Linearly polarized light emitted by a laser and oriented at, for example, −45 degrees (relative to the linearly polarized light emanating from the fiber) is reflected by the polarization sensitive reflector into the magnetized YIG. After propagating through the YIG, this light has been rotated 45 degrees (in the clockwise direction, as viewed from the fiber in FIG. 4), and thus enters the fiber horizontally linearly polarized.

While antireciprocal, light rotating devices based on bulk materials, e.g., single crystal YIG isolators and circulators, are useful, they are bulky (have typical dimensions of 3 mm by 3 mm by 3 mm), require the application of large magnetic fields (typically larger than about 1000 oersteds (Oe)), are expensive (typically costing about 1000 dollars), and are thus not entirely commercially attractive. By contrast, a thin (having a thickness less than about 10 times the wavelength of the incident light) film waveguide antireciprocal device, e.g., an optical isolator or circulator, using planar magnetization would be a much more attractive device. For example, a thin film device would permit the use of guided wave optics (and thus eliminate the need for focusing lenses, not shown in FIGS. 1 and 2), require the application of relatively small magnetic fields (smaller than about 100 Oe), and be relatively inexpensive. In addition, it could also serve as a building block for integrated optical devices (an optical device which includes two or more components, performing different functions, and formed on the same substrate) useful in optical systems.

While thin film antireciprocal devices appear to be attractive, thin film waveguides are subject to linear birefringence. (In a thin film, linearly polarized light may be represented as consisting of two orthogonal, linearly polarized components. In one of these components, the electric field of the light (an electromagnetic wave) is oriented parallel to the film surface and is denoted the TM component. In the other component, the electric field is oriented perpendicularly to the film surface and is denoted the TE component. Linear birefringence means the two components see different indices of refraction, resulting in one of these components propagating through the film at a faster speed than the other. Regarding linear birefringence in thin film waveguides see, e.g., P. K. Tien, *Applied Optics*, Vol. 10, page 2395 (1971).) Thus, when traversing a magnetized thin film, light is subjected to elliptic birefringence, i.e., a birefringence which includes both a linear component and a circular component. As a consequence, initially linearly polarized light undergoes oscillatory rotation. (The distance traversed by the light in completing one oscillation is called the birefringent period, P.) This oscillation is depicted in FIG. 5 where the incident light impinges upon a magnetized thin film at an angle of, for example, 0 degrees (to the y-axis). While propagating through the film, the light is initially rotated through a relatively small angle, e.g., 3 degrees, in, for example, the clockwise direction. Further propagation produces a counterrotation to $-3$ degrees, and still further propagation to a distance P results in the light returning to its initial orientation (i.e., parallel to the y-axis). During this oscillatory rotation, the polarization of the light also varies continuously from linear to elliptic to linear. Because the amplitude of the oscillation is constant and, for most materials, small, e.g., 3 or 4 degrees, little or no net rotation is achieved. As previously discussed, an antireciprocal device must achieve a rotation substantially beyond that normally achieved in linearly birefringent materials, and on exiting, the light should be substantially linearly polarized to avoid, for example, optical power loss at the analyzer of an optical isolator. Thus, linearly birefringent devices have effects which, without compensation, preclude their advantageous use.

A magnetized, thin film optical device advantageously used as an optical switch or modulator, which compensates for the effects of linear birefringence, has been reported. (See P. K. Tien et al, "Switching And Modulation of Light in Magneto-Optic Waveguide Garnet Films", *Applied Physics Letters*, Vol. 21, No. 8, (Oct. 15, 1972), pp. 394-396, and U.S. Pat. No. 3,764,195 issued to Blank et al on Oct. 9, 1973.) This device, pictured in FIG. 6, includes a magnetic garnet film epitaxially grown on a garnet substrate, and a serpentine microcircuit formed on the upper surface of the garnet film. The microcircuit is formed so that the direction of current flow through the circuit is reversed every half birefringent period. Thus, the direction of magnetization (along the direction of light propagation) in the thin film is reversed every half birefringent period, which allows rotation beyond that normally achieved in a linearly birefringent material, but does not eliminate ellipticity in polarization.

A device which is subject to linear birefringence and is useful as a circulator or isolator has also been reported. (See R. H. Stolen et al, "Faraday Rotation in Highly Birefringent Optical Fibers," *Applied Optics*, Vol. 19, No. 6 (Mar. 15, 1980), pp. 842-845 and E. H. Turner et al, "Fiber Faraday Circulator or Isolator," *Optics Letters*, Vol. 6, No. 7 (July 1981), pp. 322-323.) This device includes a linearly birefringent optical fiber and a plurality of spaced magnets which magnetize (in the direction of light propagation) a number of fiber regions. The polarity of each magnet is the reverse of the previous magnet, while the spacing between the magnets is half the birefringent period of the fiber. The number of spaced magnets, and thus the number of correspondingly spaced magnetized fiber regions, is empirically chosen (in relation to the particular fiber) so that light exiting the last magnetized fiber region is elliptically polarized and the light intensities along the two birefringence axes of the fiber are equal. In operation, the elliptic polarization is changed to linear polarization by passing the light through a relatively long (about six birefringent periods), nonmagnetized and heated portion of the fiber extending from beyond the last magnetized fiber region. The amount of heat is determined empirically. Alternatively, the light is passed through an external compensator, which also converts the elliptic polarization to linear polarization. The settings of the compensator (needed to achieve linear polarization) are also determined empirically. Rotation beyond that normally achieved in a linearly birefringent material, elimination of ellipticity in polarization, and thus use as an antireciprocal device are achieved. However, those engaged in the development of optical systems have sought, thus far without success, linearly birefringent optical isolator/circulator devices in which elliptically polarized light is conveniently (rather than empirically) converted to linearly polarized light.

SUMMARY OF THE INVENTION

The invention involves an optical system which includes a linearly birefringent, substantially antireciprocal device, e.g., an optical sensor or circulator. The device increases the amplitude of the polarization oscillation (which is either rectified or nonrectified) suffered by incident light to achieve a net rotation (beyond that normally achieved in linearly birefringent materials) substantially equal to 45 degrees, within a finite distance. In addition, the device conveniently converts elliptic polarization to linear polarization without the addition of heat or other empirical expedients. Moreover, this convenient conversion is achieved by a device component which is designed into the device.

The device employed in the inventive optical system includes a number of material regions which exhibit (in operation) elliptic birefringences in the light propagation direction, with either the sign and/or magnitude of the linear, or the sign and/or magnitude of the circular components of the elliptic birefringences changing from region to region. (In, for example, a thin film, a change in the sign and/or magnitude of the linear component implies, in the absence of magnetization, a change in the sign and/or magnitude of the difference in velocities between the TE and TM components. A change in the sign and/or magnitude of the circular component implies, in the absence of linear birefringence, a change in the sense (direction) and/or magnitude of the Faraday rotation.) Each region (except one) of the device has a length (in the light propagation direction) substantially equal to one-half the birefringent period of that region. However, in contrast to previous such devices, substantially antireciprocal operation is only achieved if either the first or the last material region has a length substantially equal to one-quarter the birefringent period. If the last region is one-quarter period in length, then substantially antireciprocal operation is achieved only if the polarization of the linearly polarized light incident on the first half period region is substantially parallel to one of the linear birefringence axes of the device. If the first region is one-quarter period in length, then substantially antireciprocal operation is achieved only if the polarization of the light incident on this region is oriented at an angle substantially equal to 45 degrees relative to one of the linear birefringence axes of the device.

BRIEF DESCRIPTION OF THE DRAWING

The invention is described with reference to the accompanying drawings, wherein:

FIGS. 1 and 2 are, respectively, a schematic diagram of a conventional optical fiber communication system and a schematic diagram of a conventional optical mass storage device;

DETAILED DESCRIPTION

The invention involves an optical system, e.g., an optical fiber communication system or an optical mass storage device. This system prevents errors in detected information, and/or efficiently couples light into and out of an optical fiber end, while avoiding the use of either a bulk optical isolator or a bulk optical circulator.

Figure 3:
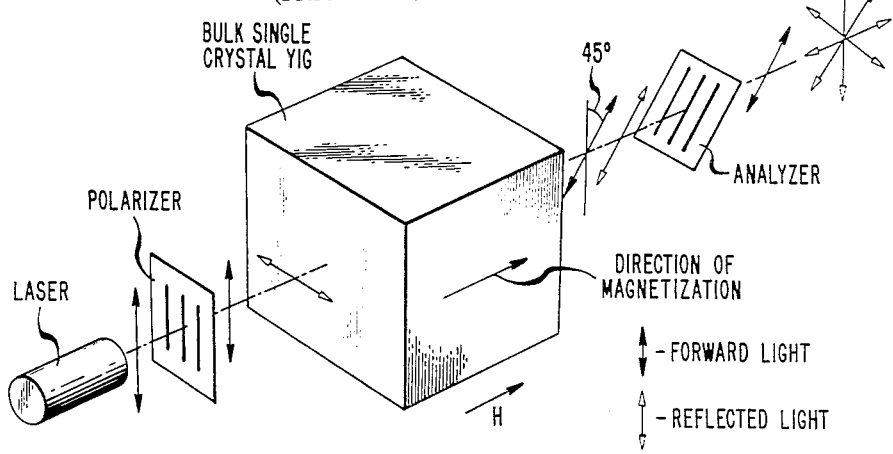
FIG. 3 is a schematic diagram of an optical system which includes a conventional, bulk single crystal magnetic garnet optical isolator.
Figure 6:
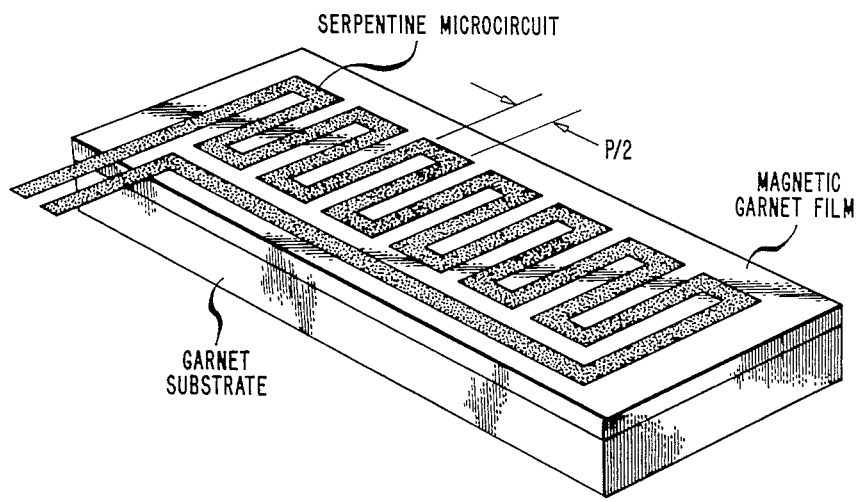
FIG. 6 depicts a known device, which includes thin film magnetic garnet material, believed useful as an optical switch or modulator.
Figure 4:
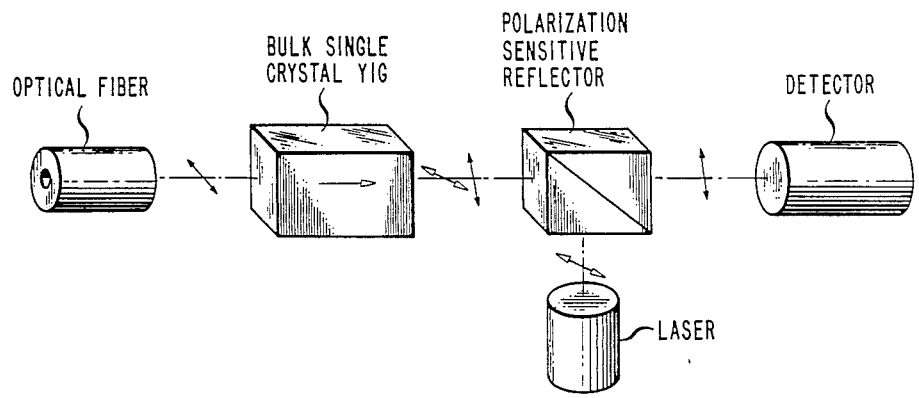
FIG. 4 is a schematic diagram of an optical system which includes a conventional, bulk single crystal magnetic garnet optical circulator.
Figure 5:
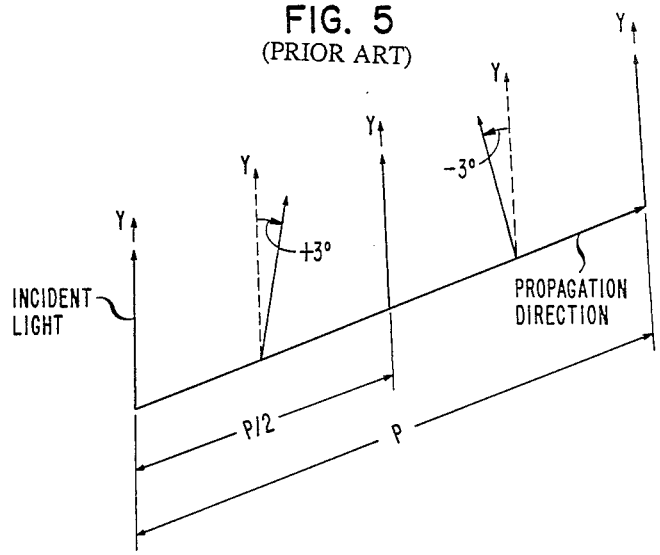
FIG. 5 depicts the oscillatory rotation suffered by light in a magnetized, linearly birefringent medium.
Figure 7:
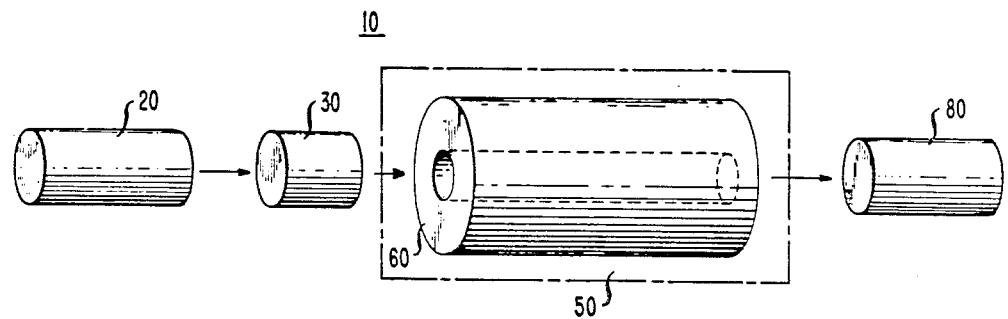
FIGS. 7-9 are schematic diagrams of three embodiments of the inventive optical system.
Figure 8:
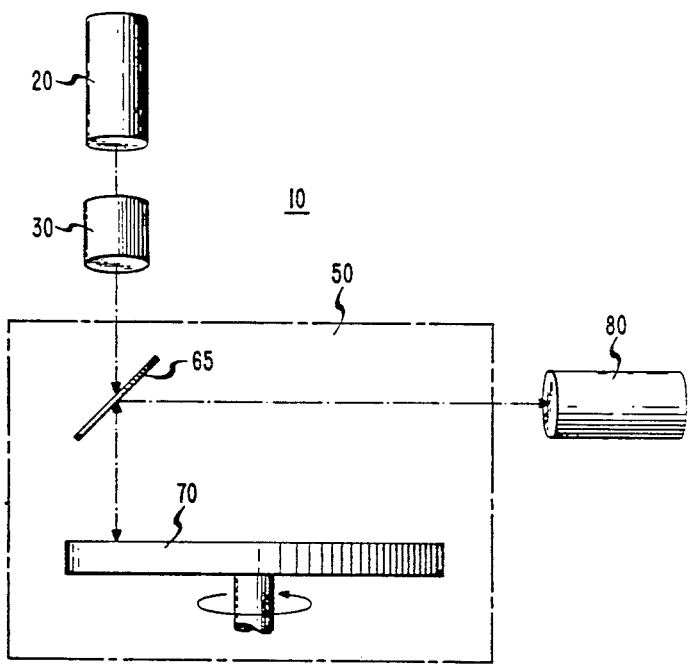
Figure 9:
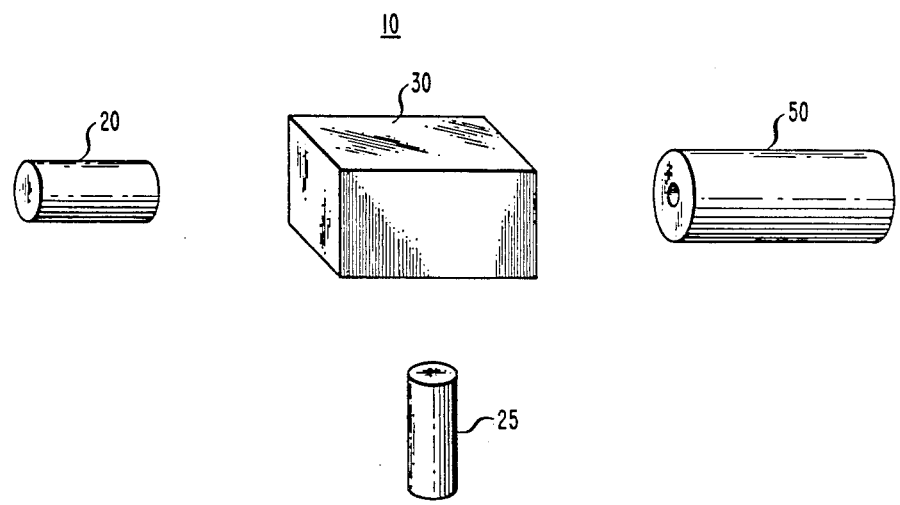
Figure 14:
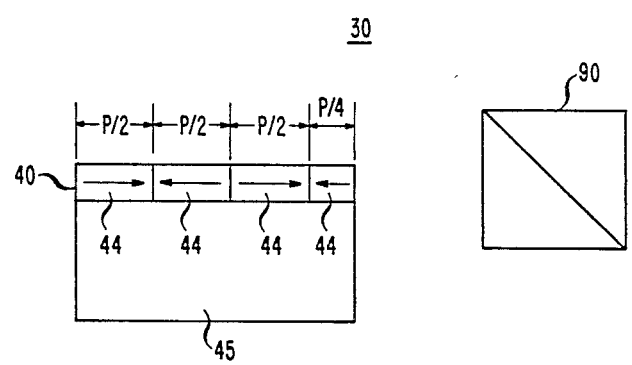
FIG. 14 depicts one embodiment of the optical circulator employed in the inventive optical system.
Figure 10:
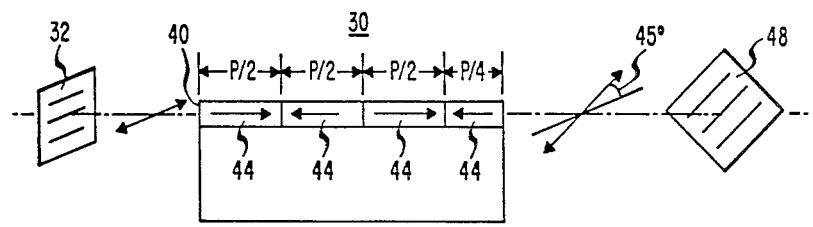
FIGS. 10-13 depict four embodiments of the optical isolator employed in the inventive optical system.
Figure 11:
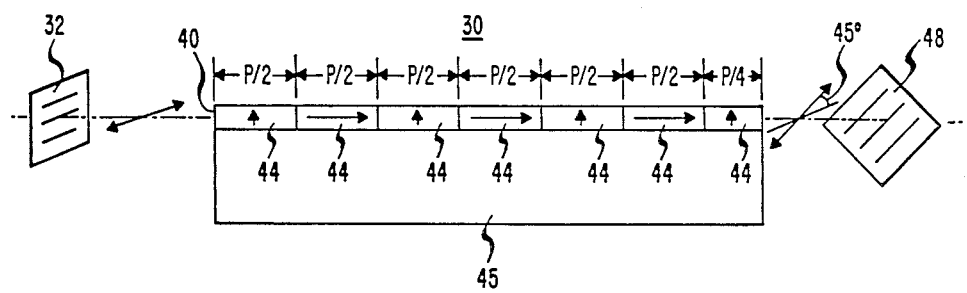

When reference to FIGS. 7-9, the inventive optical system 10 includes a system component 30 which is an antireciprocal device, e.g., an optical isolator or an optical circulator, and which includes linearly birefringent material. If, for example, the component 30 is an optical isolator, then the system 10 also generally includes the components depicted in FIGS. 7-8. That is, the system includes an optical source 20, e.g., a semiconductor laser, a system component 50 impinged upon by light emitted by the source 20 and transmitted by the optical isolator 30, as well as a photodetector 80. As shown in FIG. 7, the system component 50 includes, for example, an optical fiber 60. Alternatively, and as shown in FIG. 8, the system component 50 includes a beam splitter 65 and an optical disk 70.

If, for example, the system component 30 is an optical circulator then, as depicted in FIG. 9, the system 10 generally includes an optical source 20 and optical detector 25, as well as optical fiber 50. Light emitted by the source 20 is coupled into one end of the fiber 50 by the circulator 30. The circulator 30 also serves to couple light emanating from the fiber end into the detector 25. Generally, another optical detector and/or optical source (with or without the circulator 30) are positioned at the opposite end of the fiber. (It is assumed that in this embodiment, the optical fiber 50 is, for example, a polarization-preserving fiber. If not, then the system also includes a polarizer between the fiber 50 and the optical circulator.)

If the system component 30 is an optical isolator (see the four embodiments shown in FIGS. 10-13), then the isolator includes material 40 positioned between a polarizer 32 and an analyzer 48. The polarizer 32 and analyzer 48 are, for example, polarizing optical fibers. If the presence of the polarizer is inconvenient, then it is readily replaced by a region of metal (not shown), e.g., aluminum or gold or titanium, overlying a portion of the material 40 (traversed by light) and positioned adjacent to the optical source 20. Such a metal region absorbs reflected (backward propagating) light having a polarization transverse to that of the (forward propagating) light emitted by the optical source 20. Preferably, the thickness of the metal region ranges from about 0.01 $\mu$m to about 10 $\mu$m. Thicknesses less than about 0.01 $\mu$m are undesirable because the resulting films have undesirably low optical absorption. Thicknesses greater than about 10 $\mu$m, while not precluded, are less desirable because the resulting films do not yield greater optical absorption than thinner films, and require undesirably long fabrication times.

In operation, the analyzer 48 and material 40 serve to align the polarization of reflected (backward propagating) light substantially perpendicularly to the polarizer, thus precluding transmission to the optical source 20. If the source 20 is substantially unaffected by such perpendicularly aligned light, then the polarizer 32 (or the metal region) need not be included.

If the system component 30 is an optical circulator, then the circulator includes (see the embodiment shown in FIG. 13) the material 40. In addition, the circulator includes means 90 for directing two light beams, having different polarizations, along two different optical paths, e.g., a polarization sensitive reflector or well-known functional equivalents such as a rutile plate or plates.

The material 40 employed in the antireciprocal device, e.g., the isolator or circulator, includes a number of material regions 44 which are traversed by both forward and backward propagating light. Each of these regions is substantially transparent (at least 50 percent of the incident light is transmitted) to the light, and at least some of these regions are magnetic (i.e., magnetizable). While neither the thicknesses nor the compositions of the material regions need be the same, ease of manufacture generally favors essentially uniform thicknesses and compositions. In addition, the material regions 44 are preferably fabricated in the form of a continuous thin film (having a thickness less than about 10 times the wavelength of the incident light), although thick films are useful and are not precluded. Such thin and thick films are subject to linear birefringence, and consequently the magnetic regions, when magnetized (in the direction of light propagation), exhibit elliptic birefringences. If formed as a thin film, the material regions 44 preferably have a thickness ranging from about 0.1 $\mu$m to about 100 $\mu$m. Thicknesses less than about 0.1 $\mu$m are undesirable because such films are relatively poor optical waveguides. Thicknesses greater than about 100 $\mu$m are undesirable because light propagating through such thick films undergoes an undesirably large amount of spreading (in the thickness direction), making it difficult to couple the light directly into other optical components.

To overcome the effects of linear birefringence conveniently, i.e., to rotate incident linearly polarized light through an angle substantially equal to 45 degrees (or an odd multiple of 45 degrees) and conveniently convert elliptic polarization to linear polarization, the antireciprocal device 30 should meet two conditions. First, either the sign and/or magnitude of the linear components, or the sign and/or magnitude of the circular components, of the elliptic birefringences exhibited by the (magnetized) regions 44, should change from region to region. Secondly, each of these material regions, with the exception of either the first or the last region, should have a length in the light propagation direction which is substantially equal to one-half the birefringent period (P) in that region. (The birefringent period for each region is the distance light must propagate through that region to complete one full oscillation in its polarization orientation.) The first or the last region, by contrast, should have a length substantially equal to one-quarter the birefringent period in the first or the last region. It must be emphasized that in the absence of such a first or last region, the exiting light will not be oriented at 45 degrees (to the incident light) and will, in general, be elliptically polarized. (The birefringent period, P, in each of the regions 44 is not necessarily the same because the period depends on a number of parameters, e.g., the composition of the region, degree of magnetization in the region and wavelength of the incident light. Consequently, the birefringent period for each region is generally measured for the particular conditions under which that region is to operate. Useful measurement techniques are described in, for example, K. Ando et al, "Growth Induced Optical Birefringence in LPE-Grown Bi-Based Iron Garnet Films," *Japanese Journal of Applied Physics*, Vol. 22, No. 10, October 1983, pp. L618–L620.)

Exemplary embodiments of the optical isolator/circulator 30, which incorporate the above two conditions, are depicted in FIGS. 10–14. For example, in the embodiment depicted in FIG. 10, the sign of the circular component of the elliptic birefringences changes from region to region, i.e., the direction of the magnetization (depicted by a single-headed arrow) alternates.

Figure 12:
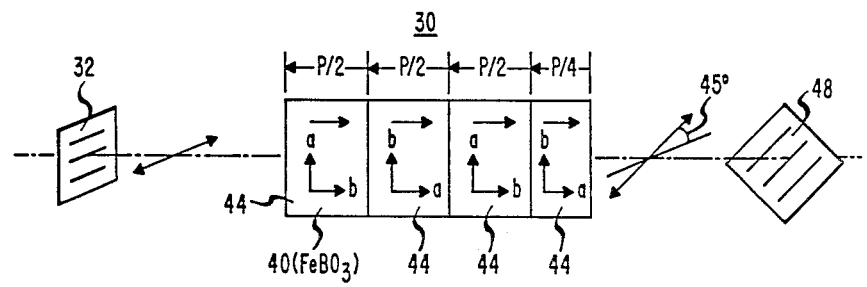
Figure 13:
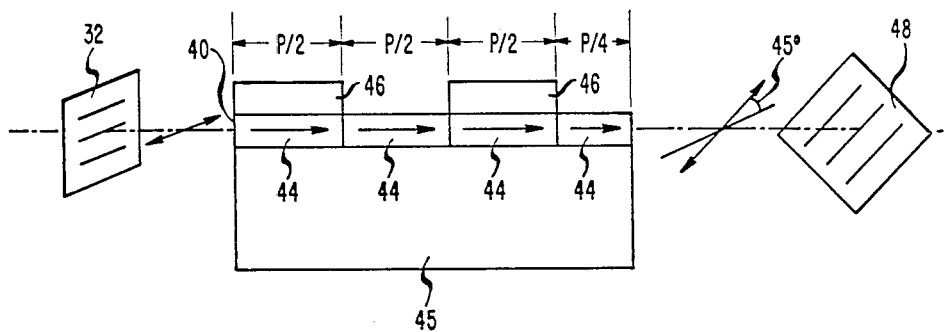

(Nonmagnetized regions of length P/2, or regions of length P/2 in which the magnetization is oriented perpendicularly to the light propagation direction, interposed between the magnetized regions, are not precluded. The presence of such regions only affects the direction of rotation, i.e., in some instances such regions convert, for example, a +45 degree rotation to a −45 degree rotation.) In the embodiment depicted in FIG. 11, it is the magnitude of the circular component which changes from region to region (the second, fourth and sixth regions in FIG. 11 have nonzero circular components because the magnetizations are aligned parallel to the light propagation direction, while the first, third, fifth and seventh regions have zero circular components because the magnetizations are aligned perpendicularly to the light propagation direction). On the other hand, the sign of the linear components of the elliptic birefringences alternates in the embodiment depicted in FIG. 12 (which is described more fully below). For the embodiment depicted in FIG. 13, it is the magnitude of the linear components which changes from region to region. (One technique for producing changes in the magnitudes of the linear components is to form every other material region with a different thickness. Alternatively, and as depicted in FIG. 13, all of the regions are initially fabricated with a uniform thickness, and then a region of material 46, having a refractive index less than that of the underlying region 44, is formed over every other region 44, using conventional selective deposition and/or etching techniques.)

In general, the number of regions having lengths substantially equal to P/2 needed to achieve a rotation substantially equal to 45 degrees (or an odd multiple of 45 degrees) is determined empirically (by, for example, measuring the rotation, beyond that normally achieved in a linearly birefringent material, produced by control samples having different numbers of regions). For purposes of the invention, a rotational angle is substantially equal to 45 degrees, or an odd multiple of 45 degrees, provided the intensity of the light emitted by the optical source 20 is at least 10 times greater than the intensity of the reflected light transmitted by the polarizer 20. In addition, and for purposes of the invention, the material regions have lengths substantially equal to P/2 and P/4 provided the number of regions has been chosen to produce, for example, a 45 degree rotation and the intensity of the light emitted by the optical source 20 is, again, at least 10 times greater than the intensity of the reflected light transmitted by the polarizer 32.

It has been found that when the compositions and thicknesses of the material regions 44 are essentially identical, and polarization rotation is achieved by using reversals in magnetization direction, then the number, N, of regions having lengths of P/2 needed to achieve a 45 degree rotation is well approximated by the relation $$\tan^{-1} \frac{2F}{\Delta\beta} = \frac{90°}{2N + 1}. \qquad (1)$$

Here, F denotes the (uniform) magnitude of the specific Faraday rotation (the number of degrees of rotation per unit length) within the material regions. On the other hand, $\Delta\beta$ denotes the (uniform) magnitude of the linear birefringence in the regions (i.e., $$\Delta\beta = 2\frac{\pi}{\lambda}|n_{TM} - n_{TE}|$$

where $n_{TM}$ and $n_{TE}$ denote, respectively, the effective index of refraction seen by the TM wave and the effective index of refraction seen by the TE wave, and $\lambda$ denotes the wavelength of the light in vacuum.)

If it is desired to use a number (N) of material regions which does not satisfy Equation (1) (for a particular wavelength of light, $\lambda$), then this desired number can still be used, and Equation (1) can still be satisfied (for the particular wavelength of light, $\lambda$) by altering F and/or $\Delta\beta$. For example, F is readily altered by altering the magnetization component in the light propagation direction. Such an alteration is readily achieved by, for example, rotating the magnetic field used to align the magnetization so that the magnetization is not parallel to the light propagation direction (thus reducing the magnetization component in the light propagation direction). Alternatively, $\Delta\beta$ is readily altered by (uniformly) changing the thickness of the material regions 44, or by forming one or more layers of material, having lower refractive indices from that of the regions 44, overlying and/or underlying the regions 44. Useful materials include, for example, silicon dioxide, silicon nitride, and gadolinium gallium garnet.

Once the number of regions needed to achieve 45 degree rotation has been determined (either empirically or, for example, by using Equation (1)), then a rotation equal to any desired multiple of 45 degrees is readily achieved by using a multiple of the (original) number of regions. However, the ordering of each successive set of regions should be the reverse of the previous set. For example, if three P/2 regions and a P/4 region (having, for example, magnetization reversals) produces a 45 degree rotation, then an additional P/4 region (with no magnetization reversal between the two P/4 regions) followed by an additional three P/2 regions (exhibiting magnetization reversals) will produce a 90 degree rotation. Further, the addition of three P/2 regions followed by a P/4 region will produce a 135 degree rotation.

It has been found that substantially antireciprocal operation is readily achieved with the inventive device (regardless of whether it produces a rotation of 45 degrees or an odd multiple of 45 degrees) provided either one of two conditions is met. The first condition is that if the P/4 region is the last material region, then the incident light should impinge upon the first material region substantially parallel to one of the two axes of linear birefringence of the device. (The linear birefringence axes denote two directions in the device which are readily determined empirically, in the absence of magnetization. For example, if linearly polarized light impinges upon unmagnetized control samples of the device at arbitrary orientations, then the linear birefringence axes are those orientations which produce no changes in polarization.) The second condition is that if the P/4 region is the first material region, then the incident light should impinge upon this region at an angle substantially equal to 45 degrees (i.e., $+45$ degrees or $-45$ degrees) relative to either one of the linear birefringence axes. (For purposes of the invention, the incident light is substantially parallel to one of the birefringence axes, or is oriented at an angle substantially equal to 45 degrees relative to one of the birefringence axes, and thus substantially antireciprocal operation is achieved, provided two conditions are met. First, the number and lengths of the material regions should be chosen to produce a rotation of 45 degrees, or an odd multiple of 45 degrees. Secondly, the intensity of the light emitted by the optical source 20 should be at least 10 times greater than the intensity of the reflected light transmitted by the polarizer 32.)

A variety of (magnetic) materials is useful in the inventive device, with the degree of utility depending, in part, on the degree of transparency to the incident light. For example, YIG is a useful material which is substantially transparent to infrared light (light having a wavelength ranging from about 0.8 $\mu$m to about 6 $\mu$m). Iron borate ($FeBO_3$) is also useful, and is substantially transparent to light of wavelengths ranging from about 0.5 $\mu$m to about 3 $\mu$m. In addition, cadmium manganese telluride is useful, and is substantially transparent to light of wavelengths ranging from about 0.6 $\mu$m to about 5 $\mu$m. Other useful materials are listed in, for example, the chapter by W. J. Tabor entitled "Magneto-Optic Materials" in *Laser Handbook*, edited by F. T. Arecchi and E. O. Schulz-DuBois (North Holland Publishing Company, Amsterdam, 1972).

A number of methods are available for producing material regions having alternating (in sign) linear or circular birefringences. For example, iron borate ($FeBO_3$), a magnetic material, evidences both circular birefringence (when magnetized) and crystalline (a form of linear) birefringence. (The two crystallographic axes of $FeBO_3$ are labeled a and b in FIG. 12.) Thus, by stacking oppositely oriented crystalline sections next to one another (as depicted in FIG. 12), a magnetic material is achieved having regions of alternating (in sign) linear birefringence. (Regarding this technique, see U.S. Pat. No. 3,617,942 issued to Kurtzig et al on Nov. 2, 1971, which is hereby incorporated by reference.)

A method for producing material regions having alternating (in sign) circular birefringences involves the application of oppositely directed magnetic fields to adjacent magnetic regions. This is achieved, for example, by forming a serpentine microcircuit on the surface of the magnetic material and producing a current in the circuit (as described in U.S. Pat. No. 3,764,195, issued to Blank et al on Oct. 9, 1973, which is hereby incorporated by reference).

Another technique for forming material regions having alternating circular birefringences, readily applicable to, for example, thin film magnetic garnet waveguides, e.g., thin film YIG waveguides, involves producing changes in sublattice magnetizations. For example, the structure of YIG ($Y_3Fe_5O_{12}$) is such that three of the five iron atoms of each molecule are located at tetrahedral lattice sites, while the remaining two iron atoms are located at octahedral sites. In addition, the three magnetic moments at the tetrahedral sites (associated with the tetrahedral iron atoms) are parallel to each other but antiparallel to the two magnetic moments at the octahedral sites. Thus, in the presence of an external magnetic field, the (dominant) tetrahedral moments align parallel to the field, while the octahedral moments align antiparallel to the field. Significantly, it is the direction of the octahedral moments which largely determines the direction of Faraday rotation.

Regions of alternating (in sign) circular birefringences in YIG are produced, for example, by reducing the magnitudes of the tetrahedral moments in selected material regions to the point where the octahedral moments in these regions are dominant. Consequently, in the presence of a magnetic field, the (now dominant) octahedral moments in the selected regions align parallel with the field, whereas the octahedral moments in the nonselected regions (where the tetrahedral moments are still dominant) align antiparallel to the field, resulting in Faraday rotations of opposite sign in the selected and nonselected regions.

Reductions in tetrahedral moments in selected YIG material regions are readily achieved by the (at least partial) substitution of nonmagnetic ions, e.g., gallium or aluminum or germanium ions, for the iron atoms located at tetrahedral sites. Such substitution is produced, for example, by initially forming, i.e., growing, the YIG material with nonmagnetic ions at both the octahedral and tetrahedral lattice sites, and then moving the nonmagnetic ions (as described below) from the octahedral to the tetrahedral lattice sites, in the selected regions.

The movement of nonmagnetic ions between lattice sites, referred to above, is readily achieved using the procedure described in U.S. Pat. No. 3,845,477 issued to Le Craw et al on Oct. 29, 1974, which is hereby incorporated by reference. Here, a thin film of YIG doped with a nonmagnetic ion is epitaxially grown, using conventional techniques, on a substrate 45 (see FIG. 7) of, for example, gadolinium gallium garnet (GGG). The doped YIG film should have a composition close to the "compensation point" (the composition which results in a zero net magnetic moment), but one such that the net tetrahedral moment still dominates the net octahedral moment. Thus, if the nonmagnetic ion is, for example, gallium, then the composition is preferably $Y_3Ga_xFe_{5-x}O_{12}$ where $1.05 \leq x \leq 1.45$. Values of x less than about 1.05 are undesirable because the resulting tetrahedral moments remain dominant even after the processing described below, i.e., octahedral domination is nowhere achieved. Values of x greater than about 1.45 are undesirable because the resulting octahedral moments are dominant and thus tetrahedral domination is nowhere achieved.

Preferential substitution of, for example, gallium ions for tetrahedrally located iron atoms in selected material regions is achieved by first forming a silicon region, having a thickness ranging from about 1000 to about 5000 Angstroms, over each of the selected material regions. The silicon regions are formed either by conventional selective deposition procedures or, alternatively, by forming a silicon layer covering the entire upper surface of the YIG film and then using conventional etching techniques to remove selected portions of the silicon layer. Then, the YIG film is annealed in an atmosphere of, for example, nitrogen at a temperature ranging from about 400 degrees Centigrade (C.) to about 800 degrees C. for a period of time ranging from about ½ hour to about 24 hours. Annealing temperatures less than about 400 degrees C. and annealing times less than about ½ hour are undesirable because they produce little or no transfer of gallium ions. Annealing temperatures greater than about 800 degrees C. and annealing times greater than about 24 hours are undesirable because all regions, including those not covered by silicon, undergo similar amounts of gallium ion transfer. After cooling to room temperature (over any desired period of time), the regions not covered by silicon are essentially unchanged, whereas the silicon-covered regions experience gallium ion transfer from octahedral to tetrahedral lattice sites.

A new technique for producing material regions having alternating (in sign) circular birefringences in a thin YIG film involves using a film sufficiently doped with a nonmagnetic ion to achieve uniform octahedral domination. Then, by moving nonmagnetic ions from tetrahedral to octahedral lattice sites in selected material regions, these regions become tetrahedrally dominated. Consequently, and in the presence of a magnetic field, the octahedral moments in the selected material regions align themselves antiparallel to the magnetic field, while the octahedral moments in the nonselected regions align themselves parallel to the magnetic field.

As noted, the YIG films employed in the technique have a composition which, while close to the "compensation point", results in octahedral domination. If gallium is the nonmagnetic ion, then the composition of this film is $Y_3Ga_zFe_{5-z}O_{12}$ where $1.1 \leq z \leq 1.5$. Values of z less than about 1.1 are undesirable because the resulting films have dominant tetrahedral (rather than dominant octahedral) moments. On the other hand, values of z greater than about 1.5 are undesirable because the resulting octahedral moments remain dominant, even after the processing described below.

Gallium ion transfer from tetrahedral sites to octahedral sites, in selected material regions, is achieved by heating the selected material regions to a temperature of at least 1200 degrees C. for a period of time equal to at least 1 $\mu$sec, and then cooling the selected material regions to room temperature over a period of time less than about 10 sec, and preferably less than about 0.1 sec. Heating temperatures less than about 1200 degrees C. and heating times less than about 1 $\mu$sec are undesirable because they result in undesirably small numbers of gallium ions being transferred from tetrahedral sites to octahedral sites. On the other hand, cooling times greater than about 10 sec are undesirable because undesirably many gallium ions, initially moved from tetrahedral to octahedral sites, move back to tetrahedral sites, leaving sublattice dominance unchanged. The above heating and cooling procedure is readily achieved in selected material regions by selective scanning with a laser, e.g., a continuous wave (CW) argon ion laser.

The above-described techniques for modifying sublattice magnetizations assume that the YIG films (doped with nonmagnetic ions) have easy axes of magnetization which are parallel to the upper surfaces of the films (and thus aligned with the light propagation direction). However, the as-grown films typically exhibit both growth induced anisotropies and magnetostrictive, e.g., compressive, anisotropies. The former result in easy axes of magnetization which are perpendicular to the film surfaces, while the latter lead to easy axes of magnetization which are parallel to the film surfaces. If the growth induced anisotropies are so large that the easy axes of magnetization are perpendicular to the film surface, then these anisotropies must be eliminated. In most instances, this is readily achieved using conventional annealing techniques (see, e.g., A. J. Kurtzig and F. B. Hagedorn, "Noncubic Magnetic Anisotropies in Bulk and Thin Film Garnets," *IEEE Transactions on Magnetism*, Vol. MAG7, page 473 (1971)).

It is known that doping YIG films with bismuth (which substitutes for Y) significantly increases the degree of Faraday rotation but also leads to enhanced growth induced anisotropies. In addition, it has long been believed that these enhanced growth induced anisotropies cannot be annealed out of the material because the necessary temperatures are so high (higher than about 1300 degrees C.) that the YIG films are seriously damaged or destroyed (see, e.g., P. Hansen et al, "Magnetic and Magneto-Optical Properties of Bismuth-Substituted Gadolinium Iron Garnet Films", *Physical Review B*, Vol. 27, No. 7, Apr. 1, 1983, pp. 4375–4383).

It has been found that the growth induced anisotropies of bismuth-doped YIG films are readily annealed out of the films, without damaging the films, by doping the films with Ca (which replaces Y) prior to annealing. Preferably, the composition of the bismuth- and calcium-doped films is $Y_{3-a-b}Bi_aCa_bFe_{5-c}X_cO_{12}$, where $0.2 \leq a \leq 2.0$, $0.001 \leq b \leq 0.1$, X denotes, for example, a nonmagnetic ion, e.g., gallium, and c denotes the amount of X per unit formula. In addition, annealing temperatures preferably range from about 900 degrees C. to about 1300 degrees C. and annealing times preferably range from about ¼ hour to about 24 hours. Values of a less than about 0.2 are undesirable because the resulting Faraday rotation is reduced rather than increased. Values of a greater than about 2.0 are undesirable because the growth of, for example, thin films of high optical quality is difficult. Values of b less than about 0.001 are undesirable because the required annealing temperature is undesirably high. Values of b greater than about 0.1 are undesirable because the resulting films have undesirably low transparencies to, for example, infrared light. Annealing temperatures less than about 900 degrees C. and annealing times less than about ¼ hour are undesirable because the growth induced anisotropies of the resulting films are undesirably high. Annealing temperatures greater than about 1300 degrees C. and annealing times greater than about 24 hours are undesirable because the resulting films are often decomposed.

A variety of techniques also exist for producing material regions in, for example, YIG, having magnetizations aligned parallel and perpendicular to the light propagation direction. One such technique is described, for example, by E. M. Gyorgy et al in "Local Control of Uniaxial Anisotropy In LPE Bubble Garnet Films," *Applied Physics Letters*, Vol. 25, No. 3, pp. 167–168 (1974).

Typically, waveguiding, e.g., thin film or optical fiber, antireciprocal polarization rotators (APRs) are designed to rotate the polarizations of only one or several selected guided modes. (If electromagnetic radiation is approximated as rays of light, then the guided modes referred to here are those light rays which undergo total internal reflection within, for example, the thin film or optical fiber core of an APR. Such total internal reflection is achieved by virtue of the thin film or optical fiber core having a higher refractive index than the underlying or surrounding medium, e.g., the substrate supporting the thin film or the cladding surrounding the optical fiber core.) Consequently, it has been believed that the performance of such APRs is increasingly enhanced as the number of unwanted guided modes (i.e., guided modes which are not correctly rotated by the APRs) is reduced. This belief is based on the assumption that it is only the guided modes which are of significance to the operation of APRs.

Previous attempts (by others) to form waveguiding APRs having a reduced number of (unwanted) guided modes involved the recognition that the number of guided modes could be reduced by reducing either one of two parameters. That is, for a fixed thickness of the waveguiding APR, reducing the refractive index difference, $\Delta n$, between the APR and the underlying or surrounding medium reduces the critical angle (the largest angle, measured from the interface between the APR and the underlying or surrounding medium, at which light rays are totally internally reflected), thus reducing the possible number of guided modes. Alternatively, for a fixed $\Delta n$, reducing the thickness of the APR, e.g., reducing the thickness of the APR thin film or the diameter of the APR optical fiber core, increases the angular spacing between rays in adjacent modes, which again reduces the number of guided modes.

In the case of, for example, a film of YIG formed on a GGG substrate, the relatively large refractive index difference between the YIG and GGG (the refractive index of YIG is about 10 percent higher than that of GGG) results in many modes being guided by the YIG film. Consequently, to achieve single mode operation, the thickness of the YIG film should be reduced to about 1 $\mu$m or less. While such very thin YIG films are readily formed using, for example, conventional liquid phase epitaxy (LPE) techniques, such thin films are often inconvenient because it is difficult to align light sources, e.g., semiconductor lasers, with, and thus couple light into, such films. Moreover, these very thin films sometimes introduce an undesirably large amount of linear birefringence into an APR.

Figure 16:
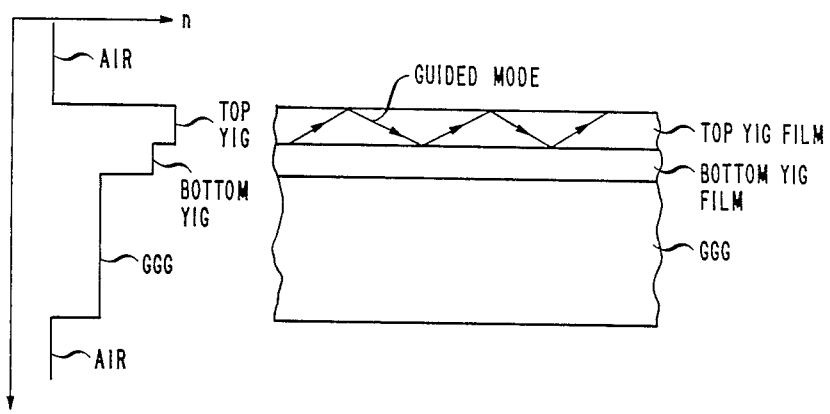
FIG. 16 depicts a known two-layer device for reducing unwanted guided modes.

To achieve single mode operation without the use of very thin films, devices have previously been fabricated (by others) which include two layers of (compositionally modified) YIG formed on a GGG substrate (as shown in FIG. 16). (See A. Shibukawa et al, *Applied Optics*, 20, page 2444 (1981).) The bottom YIG layer has a refractive index which is slightly lower than that of the top YIG layer (by virtue of a slightly different composition) but higher than that of the GGG substrate (see the refractive index profile in FIG. 16). The top YIG layer has a thickness of several microns. Because the refractive index difference between the top and bottom YIG layers is much smaller than that between the top (or bottom) YIG layer and the GGG, single mode guiding is achieved in the top YIG layer.

It has been found (by the present inventors) that reducing the number of guided modes within a waveguiding APR (to those for which the APR was designed) is not, in itself, sufficient to enhance the performance of the APR in many instances. For example, if the waveguiding APR is a component of an optical isolator (see FIG. 10), then the guided, polarization-rotated mode or modes will be transmitted by the analyzer of the optical isolator to, for example, an optical fiber. If any of this transmitted light should be reflected by the optical fiber back through the analyzer toward the APR, this light will often strike the interface between the waveguiding APR, e.g., a YIG layer, and the underlying material, such as a (lower refractive index) second YIG layer or GGG substrate, at an angle which is greater than the critical angle. Consequently, this reflected light will neither be guided, nor correctly rotated, by the APR. However, in many instances, the reflected light will be guided by a waveguide which includes both the APR and the underlying substrate material. This backward propagating light, guided by the substrate and APR, will often exit the substrate to strike the light source being shielded by the optical isolator, thus reducing the effectiveness of the optical isolator.

It has further been found that the effectiveness of waveguiding APRs employed in, for example, optical isolators and circulators, is substantially increased provided two conditions are met. First, the number of modes guided by the APRs should be reduced (as much as practical) to those which are correctly rotated by the APRs. Secondly, and equally importantly, the substrate materials underlying the APRs, e.g., the material supporting a waveguiding film or the cladding encircling the waveguiding core of an optical fiber, should include material which reduces the electromagnetic energy of the light guided by the substrate and APR, by at least a factor of 10 over the length of the APR.

Figure 17:
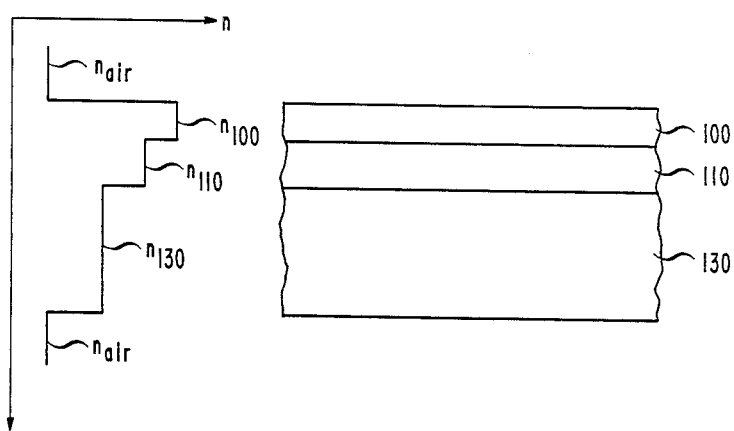
FIGS. 17-21 depict embodiments of the inventive antireciprocal device.

The first condition is satisfied by, for example, forming the APR with a relatively small thickness (a thickness chosen to reduce the number of unwanted guided modes). (The appropriate thickness is generally determined empirically by using control samples of varying thickness.) Alternatively, the refractive index difference between the APR and the underlying or surrounding medium is reduced. This is achieved, for example, by forming the APR, e.g., a waveguiding region 100 (see FIG. 17), over a region (or regions) 110 of material having a refractive index less than that of the region 100 but greater than that of an underlying substrate 130. The refractive index difference, $\Delta n$, between the regions 100 and 110 (both of which are assumed to have uniform refractive indices, as shown in FIG. 17) needed to guide the desired number of modes is, for example, determined empirically (using control samples with different refractive indices). Alternatively, the $\Delta n$ needed to achieve guiding of up to m modes (m=0,1,2, ...) is well approximated by the requirement that $$\Delta n > \frac{(2m + 1)^2 \lambda_0^2}{16(n_{100} + n_{110})t^2}, \quad (2)$$

where $n_{100}$ and $n_{110}$ denote the refractive indices of, respectively, the regions 100 and 110, t denotes the thickness of the waveguiding region 100, and $\lambda_0$ denotes the wavelength (in vacuum) of the guided light. (Regarding the above formula see R. G. Hunsperger, *Integrated Optics: Theory and Technology* (Springer-Verlag, Berlin, 1982), page 37.)

The second condition is satisfied provided, for example, the material underlying a waveguiding APR, e.g., substrate material or the material of an underlying region such as the region 110 (see FIG. 17) absorbs the modes which are not confined to the APR. This absorbing material, e.g., intrinsically absorbing substrate material or absorbing dopants added to the substrate material, should have an absorption coefficient (at the wavelength of interest) which is at least 10 times greater than that of the material of the APR. Moreover, this absorbing material should be nonfluorescing at the wavelengths of interest (to protect light sources from re-emitted light). Preferably, to avoid undesirably large reductions in the intensities of the guided modes, the absorbing material should be sufficiently spaced from the APR so that the electromagnetic energies of the guided modes are reduced by no more than about 50 percent over the length of the APR. (The evanescent fields of the guided modes, i.e., the exponentially decaying portions of the electric fields associated with the guided light, contain a significant amount of energy and often extend well beyond the confines of the APR.) Appropriate spacings are generally determined empirically. (Materials which scatter rather than absorb the light are less desirable because scattered light may, for example, strike an optical source which is to be shielded.)

If the APR 100 shown in FIG. 17 is formed in, for example, a bismuth (Bi)-doped layer of YIG (as described above), and the substrate 130 is of GGG, then the first condition is satisfied provided the region 110 is a Bi-doped YIG layer having a refractive index lower than that of the region 100 (but greater than that of the GGG substrate 130). This is achieved, for example, by reducing the amount of Bi in the region 110. Such a reduction is readily achieved by raising the growth temperature or by decreasing the rotation rate during the LPE growth of the region 110 from the same melt as that used for the region 100. Alternatively, the region 110 is grown from a different melt, with a reduced concentration of Bi in the constitutive elements.

To achieve the second condition, an absorbing dopant, such as praseodymium (Pr), or germanium or cobalt or nickel (which exhibit different absorption spectra), is incorporated into the Bi-doped YIG layer 110 (via the initial melt). (The absorption spectrum of, for example, Pr shows absorption peaks at wavelengths of 1.48 $\mu$m and 1.54 $\mu$m, but exhibits relatively low absorption at 1.51 $\mu$m.) If, for example, Pr is used as the absorbing dopant, then the amount of Pr ranges from about 0.05 to about 2 atoms per formula unit. Amounts less than about 0.05 are undesirable because they result in undesirably low absorption. Amounts greater than about 2 are undesirable because the resulting layers have such large lattice constants that it is difficult, if not impossible, to achieve good epitaxial growth on a GGG substrate. (If substrates with larger lattice constants are used, then the amount of Pr can range up to about 3 atoms per formula unit.)

The thickness of the top YIG region 100 preferably ranges from about 1 $\mu$m to about 100 $\mu$m. Thicknesses less than about 1 $\mu$m, while not precluded, are less desirable because it is often difficult to couple light into such thin films and because the linear birefringence of the films is often undesirably large. Thicknesses greater than about 100 $\mu$m, while not precluded, are undesirable because light propagating through such thick films undergoes an undesirably large amount of spreading in the thickness direction, making it difficult to couple the light directly into other optical components. Moreover, such thick films are difficult to grow by epitaxial techniques.

The thickness of the bottom YIG region 110 ranges from about 0.01 $\mu$m to about 100 $\mu$m. Thicknesses less than about 0.01 $\mu$m are undesirable because such thin films absorb an undesirably small amount of the light guided by the two YIG regions. Thicknesses greater than about 100 $\mu$m undesirable because such thick films are difficult to grow by epitaxial techniques.

Figure 18:
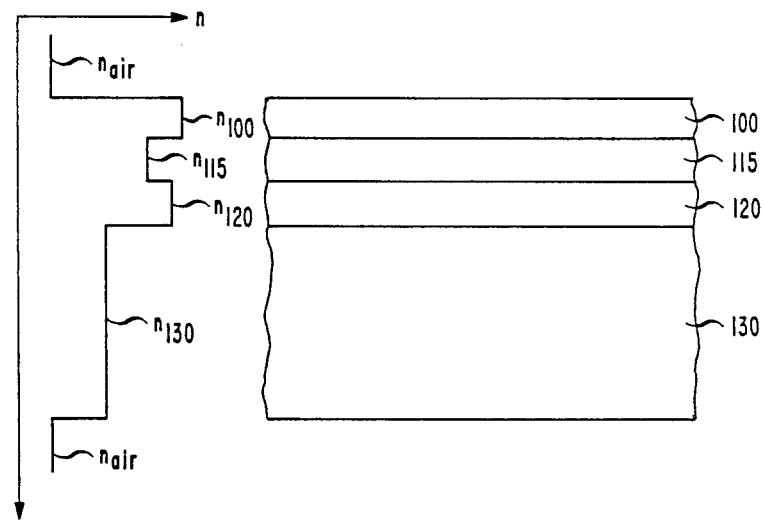

In a preferred embodiment of the invention, depicted in FIG. 18, absorption of the evanescent fields associated with the modes guided by the APR 100 is avoided, or significantly reduced, by forming two material regions 115 and 120 between the APR 100 and the substrate 130. Here, it is the region 120 which includes the absorbing material, while the region 115 (which has no strongly absorbing material) is made sufficiently thick to avoid absorption by the region 120 of the evanescent fields associated with the modes guided by the APR. As shown in FIG. 18, to achieve guiding (total internal reflection) within the APR 100, the region 115 has a lower refractive index than the APR 100. However, to avoid total internal reflections at the interface between the regions 115 and 120, and hence to avoid unwanted modes, the refractive index of the region 120 is equal to or greater than that of the region 115.

If the regions 100, 115, and 120 are, for example, of Bi-doped YIG, then the required variations in refractive index are achieved by varying the amount of Bi, as described above. In addition, an absorbing dopant, such as Pr, is incorporated into the region 120 (via the initial melt). The range on the amount of Pr is as given above, for the reasons given above.

The thickness of the region 100 extends over the range given above, and for the reasons given above.

The thickness of the region 115 ranges from about 0.1 $\mu$m to about 100 $\mu$m. Thicknesses less than about 0.1 $\mu$m are undesirable because such thin films contain undesirably small portions of the evanescent fields associated with the modes guided by the region 100. Thicknesses greater than about 100 $\mu$m are undesirable because such thick films are difficult to grow by epitaxial techniques.

The thickness of the region 120 extends over the range given above for the region 110, and for the reasons given above.

Figure 19:
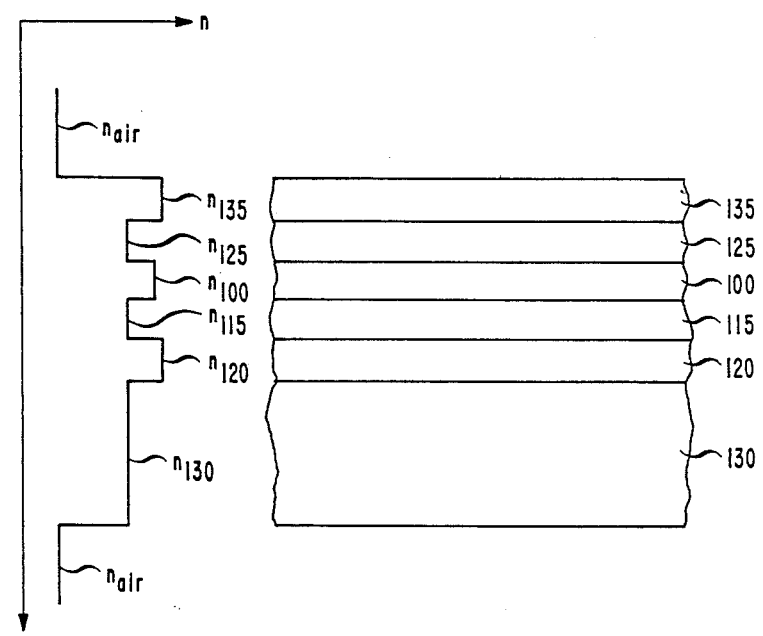

In a variant of the preferred embodiment, depicted in FIG. 19, the APR region 100 is topped by two material regions 125 and 135 similar in function to the regions 115 and 120. The material region 125, which is free of strongly absorbing material, has a refractive index which is lower than that of the APR region 100 but higher than that of the surrounding air. As a consequence, the linear birefringence of the APR region is reduced. The region 135 contains strongly absorbing material and has a refractive index which is equal to or higher than that of the region 125 to avoid total internal reflection at the boundary between regions 125 and 135.

Figure 20:
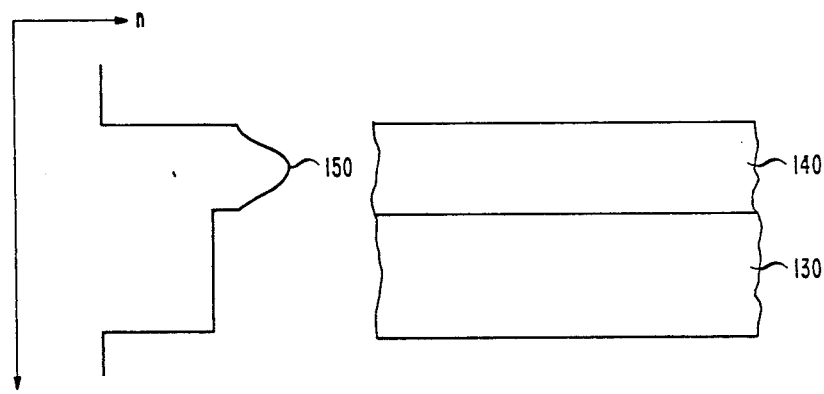

The embodiments of the invention discussed above, including those depicted in FIGS. 17-19, all include different regions of material, with each region having an essentially uniform composition and essentially constant refractive index across its thickness, and with (what are assumed to be) refractive index discontinuities at the interfaces between the different regions. But the invention is not at all limited to devices having such discontinuities because waveguiding is readily achieved using devices having graded, i.e., smoothly varying, refractive indices. For example, FIG. 20 depicts an embodiment of the invention which includes a single material region 140, having a graded refractive index profile, which is functionally equivalent to the two regions 100 and 110 depicted in FIG. 17. Waveguiding of one or more selected modes is achieved by virtue of a local waveguiding maximum 150 (defined below) in the refractive index profile of the region 140 (see FIG. 20). Absorption of modes which are not guided by the local waveguiding maximum is achieved by, for example, incorporating an absorbing dopant into at least a portion of the region 140, positioned below the local waveguiding maximum.

Figure 21:
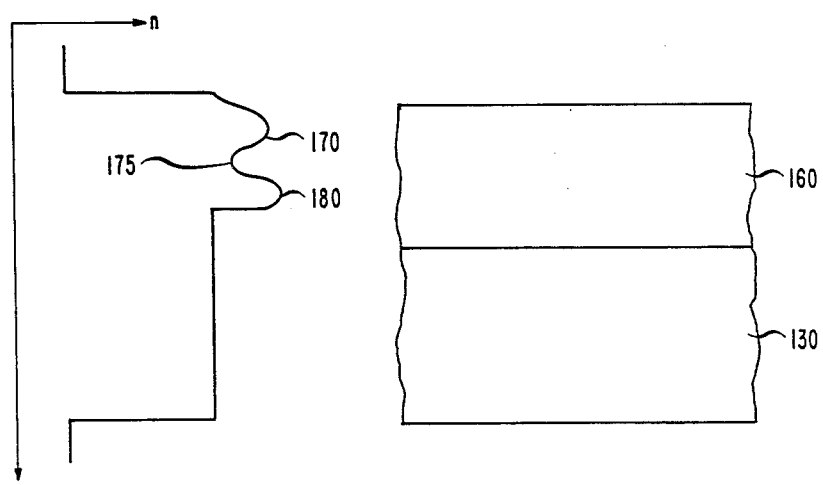

Still another embodiment of the invention, depicted in FIG. 21, includes a single material region 160, having a graded refractive index profile, which is functionally equivalent to the three regions 110, 115, and 120 depicted in FIG. 18. Waveguiding of one or more selected modes is achieved by virtue of the local waveguiding maximum 170 (see FIG. 21) in the refractive index profile of the region 160. A second local waveguiding maximum 180, separated from the first local waveguiding maximum 170 by a local minimum 175, prevents unwanted modes. Absorption of the modes not guided by the local waveguiding maximum 170 is achieved by, for example, incorporating an absorbing dopant into at least a portion of the region 160, positioned below the local minimum 175, and extending across the local maximum 180.

As noted above, a local waveguiding maximum in a refractive index profile is essential to achieve guiding of one or more modes. For purposes of the invention, the concept of a local waveguiding maximum is not limited to graded refractive index profiles, but is applicable to any profile, including discontinuous profiles. That is, and for purposes of the invention, a refractive index profile includes a local waveguiding maximum provided two requirements are met. First, after carrying out a Fourier analysis of the profile, the curve defined by the sum of the resulting Fourier components, excluding components having wavelengths smaller than 0.05 $\lambda_0$ (the wavelength, in vacuum, of the light to be guided), should include a local maximum. Second, this local maximum (a point on the curve) should have a height (amplitude) which is at least 0.001 percent greater than the heights of two points at least 0.02 $\lambda_0$ to either side of this local maximum. (While heights smaller than 0.001 percent are useful, such small heights are generally undesirable because they lead to undesirably small amounts of waveguiding, i.e., the evanescent fields of the guided modes extend undesirably far from the guiding region.)

If, for example, the above Fourier analysis is carried out on the discontinuous profiles shown in FIGS. 17 and 18, then the curves defined by the sums of the corresponding Fourier components (excluding components having wavelengths smaller than 0.05 $\lambda_0$) look very much like the index profiles depicted in, respectively, FIGS. 20 and 21. The local maxima in these curves are local waveguiding maxima provided the magnitudes of the discontinuous changes in refractive index in the original profiles are bigger than 0.001 percent of the corresponding, smaller refractive indices.

EXAMPLE 1

A magnetic film of $Y_{3-a-b}Bi_aCa_bFe_{5-c}Ga_cO_{12}$, where a is about 0.5, b is about 0.03, and c is about 1.3, having a thickness of 2.8 $\mu$m, was grown on the (111) surface of a gadolinium gallium garnet (GGG) substrate, using conventional liquid phase epitaxy techniques. The growth temperature was about 900 degrees Centigrade (C). This film had a growth induced anisotropy which produced an easy axis of magnetization perpendicular to the film surface. The film also had a compressive anisotropy, induced by the presence of the (Y-substituting) Bi and Ca, which, in the absence of the growth induced anisotropy, produces an easy axis of magnetization parallel to the film surface. (The Bi also increases the degree of Faraday rotation in the film.)

The film-supporting GGG substrate was placed between the pole pieces of a magnet, and the film was magnetized (to produce a net moment aligned perpendicularly to the film surface) with a saturating magnetic field of 2000 Oe. White light was then passed through a monochrometer to produce light of wavelength equal to 1.5 $\mu$m, which was then directed into the film at normal incidence to the film surface. Using the conventional technique described in the chapter written by J. F. Dillon, Jr. in *Physics of Magnetic Garnets*, edited by A. Paoletti (North Holland, 1978), pp. 379-416, the Faraday rotation suffered by the 1.5 $\mu$m light was measured to be 140 degrees/cm, the sign of this rotation corresponding to octahedral sublattice domination of the magnetization.

The growth induced anisotropy of the film was eliminated (producing an easy axis of magnetization parallel to the film surface) by initially annealing the film, in a nitrogen atmosphere, at about 1000 degrees C. for about 17 hours. The film was then slowly cooled (within the annealing furnace) to room temperature (about 23 degrees C.) over a period of about 17 hours.

Figure 15:
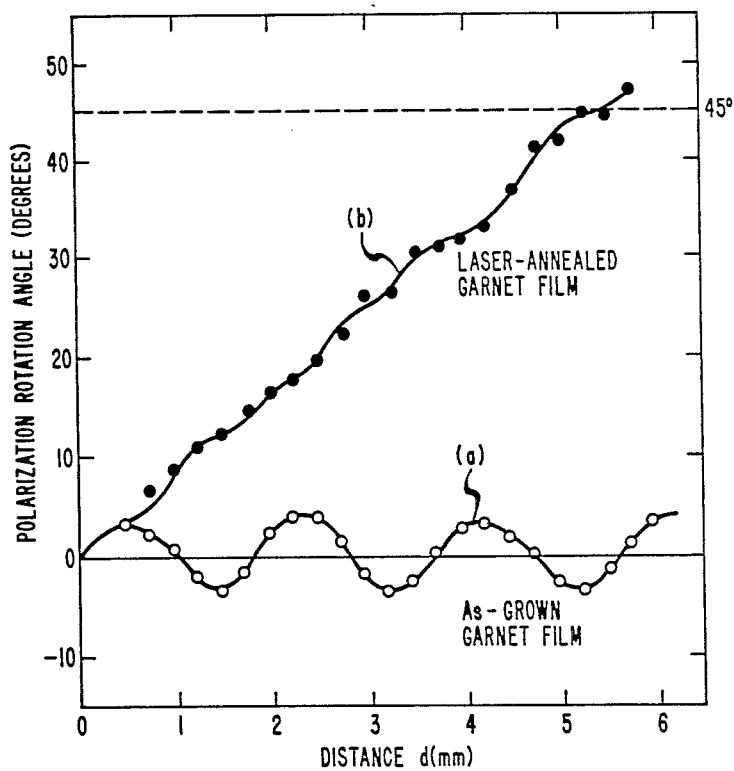
FIG. 15 depicts the degree of polarization rotation, as a function of light propagation distance, achieved with one embodiment of the antireciprocal device employed in the inventive optical system.

A small bar magnet (which produced a saturating magnetic field of about 100 Oe), aligned parallel to the film surface, was used to magnetize the annealed film (the net moment being parallel to the film surface). Linearly polarized, infrared light (of wavelength equal to 1.45 $\mu$m) from a KCl:Tl$^{(0)}$ color center laser (tunable from 1.4 $\mu$m to 1.6 $\mu$m), purchased from Burleigh Instruments Company of Fishers, N.Y., was then coupled into the film through a rutile prism (purchased from the Optics for Research Corporation of Caldwell, N.J.). (Of the several modes which could be coupled into the film, it was the TM$_0$ mode which was employed here.) The degree of rotation suffered by the light in traversing the film was measured by rotating an analyzer (positioned adjacent the output end of the film) relative to a polarizer (positioned adjacent the input end of the film) until a minimum in the intensity of the transmitted light was achieved. This procedure was then repeated with the coupling prism placed at different positions along the length of the film. The resulting polarization rotations, as a function of the distance traversed by the light, is plotted in FIG. 15(a). From this plot (which indicates the rotation oscillated from about +4 degrees to about −4 degrees), the birefringent period of the film was determined to be 1.84 mm.

A cw argon ion laser, whose light output was focused with a 20 cm focal length lens to a spot size (on the film) of about 40 $\mu$m, was used to laser anneal regions of the film (and thus produce regions of reversed sublattice magnetization). Annealing was achieved by setting the laser power at 0.85 watts (about 10 percent below the threshold for damage to the film) and moving the film relative to the laser (and parallel to a polished edge of the film) at 2 cm/sec, in a raster pattern with 20 $\mu$m spacing. Several bands 0.92 mm (half the birefringent period) wide were annealed, the annealed bands being separated by unannealed bands also having widths of 0.92 mm. A band having a width of 0.46 mm (one-quarter the birefringent period), next to the polished edge of the film, was left unannealed. The resulting laser annealed regions appeared dark compared to the unannealed regions.

To bleach the darkened, laser annealed regions, the film was heated in an atmosphere of N$_2$ (85 percent by volume) and H$_2$ (15 percent) at 350 degrees C. for about 1 hour.

Linearly polarized light from the color center laser was again coupled into the bleached, laser annealed film through the rutile prism. The resulting rotations of the light, as a function of the distance of the prism from the polished edge of the film (the distance traversed by the light), is plotted in FIG. 15(b). As is evident from this figure, the rotation increased monotonically with distance. (That is, the amplitude of the polarization oscillations suffered by the light increased with distance.) Moreover, and after traversing five-half birefringent periods and one-quarter birefringent period (a total distance of 5.06 mm), the light had been rotated through an angle of +45 degrees and was linearly polarized.

To verify the antireciprocal nature of the rotation, light polarized at +45 degrees (and propagating in the reverse direction) was coupled into the polished edge of the film. This light was found to have an orientation of +90 degrees after traversing the one-quarter birefringent period- and five half birefringent period-length regions of the film.

EXAMPLE 2

Three iron garnet films were grown on a (111)-oriented surface of a GGG substrate using conventional liquid phase epitaxy techniques. The top, magneto-optically active film was grown at a temperature of 950 degrees C. and had a nominal composition of $Y_{2.5}Bi_{0.5}Fe_{3.6}Ga_{1.4}O_{12}$. This composition was chosen so as to be able to produce periodic reversals in magnetization direction using the laser annealing technique, described above. A small amount of Ca (less than about 0.2 atoms per formula unit) was also incorporated into the top film to assure low optical absorption and to provide oxygen vacancies which facilitate the removal of the growth-induced uniaxial magnetic anisotropy by high temperature furnace annealing.

The middle garnet film was grown from the same melt used for the top film, but the growth temperature was 15 degrees C. higher. Consequently, this film grew more slowly than the top film, less Bi was incorporated into this film (about 0.1 less Bi per formula unit), and the refractive index was consequently slightly lower than that of the top film.

The bottom garnet film had a nominal composition of $Y_{1.7}Bi_{0.5}Pr_{0.3}Lu_{0.5}Fe_{3.6}Ga_{1.4}O_{12}$. The Pr was added to produce absorption of light, while the Lu was added to achieve a lattice match to the GGG substrate.

The refractive indices of the three films were estimated to be (from top to bottom) 2.17, 2.16, and 2.18 (at a wavelength of 1.5 $\mu$m). These estimates were based on the measured refractive indices of three corresponding single films, the measurements being made using the conventional prism coupling method.

The thicknesses of the three garnet films (on the GGG substrate) were measured using the conventional interference method (visible light at 45 degrees incidence angle was used). These thicknesses were (from top to bottom) 3.5 $\mu$m, 4.4 $\mu$m and 5.9 $\mu$m.

The waveguide modes of the three-film structure were investigated by coupling infrared light into the structure through a rutile prism at a distance of 8 mm from an edge of the structure. The light emerging from this edge was detected with an infrared-sensitive TV camera (Model No. 7290 sold by the Electrophysics Corporation of Nutley, N.J.). A KCl:Tl$^{(0)}$ color center laser (purchased from Burleigh Instruments Company of Fishers, N.Y.), tunable from 1.4 $\mu$m to 1.6 $\mu$m, was used as the infrared light source. The angle of incidence of the laser light was varied from about 3 degrees to about 25 degrees (measured from the perpendicular to the hypotenuse face of the 45°–45°–90° prism) to launch various TE modes into the three-film structure. The wavelength of the light was also varied from 1.51 $\mu$m, a wavelength at which the bottom Pr-containing film was highly transparent, to 1.48 $\mu$m and then to 1.54 $\mu$m, wavelengths at which the bottom film was highly absorbing.

At 1.51 $\mu$m, 17 TE modes were launched into, and were detected emanating from, the three-film structure. At 1.48 $\mu$m and 1.51 $\mu$m, only the intensity of the TE$_o$ mode was essentially unaffected. The intensities of each of the other sixteen TE modes emanating from the structure were reduced by at least a factor of 100.

What is claimed is:

1. An optical system, comprising:
   a source of electromagnetic radiation;
   a component of said system, capable of optical communication with said source, serving to transmit or reflect at least a portion of the electromagnetic radiation emitted by said source; and
   a device which includes a substantially antireciprocal polarization rotator, said device being capable of optical communication with said source and said component, wherein
   said device exhibits a refractive index profile which includes a first local waveguiding maximum positioned within said rotator, and said device further includes means for reducing the electromagnetic energy of at least a portion of the electromagnetic radiation which traverses said device but is not guided by said rotator during the operation of said system.

2. The optical system of claim 1 wherein said refractive index profile includes a second local waveguiding maximum positioned within said device but outside said rotator.

3. The optical system of claim 2 wherein said means includes material capable of absorbing electromagnetic radiation.

4. The optical system of claim 3 wherein said device includes at least first, second and third material regions, said first material region including said rotator and thus said first local waveguiding maximum being positioned within said first region, said second local waveguiding maximum being positioned within said third region, and said third region including said absorbing material.

5. The optical system of claim 1 wherein said means includes material capable of absorbing electromagnetic radiation.

6. The optical system of claim 5 wherein said device includes at least first and second material regions, said first material region including said rotator and said second material region including said absorbing material.

7. The optical system of claim 1 wherein said device includes material including yttrium, iron and oxygen.

8. The optical system of claim 7 wherein said material further includes bismuth.

9. The optical system of claim 1 wherein said device includes an optical isolator.

10. The optical system of claim 1 wherein said device includes an optical circulator.

11. The optical system of claim 1 further comprising an optical detector for detecting at least a portion of the electromagnetic radiation transmitted or reflected by said component.

12. The optical system of claim 1 wherein said source includes a semiconductor laser.

13. The optical system of claim 1 wherein said component includes an optical fiber.

14. The optical system of claim 1 wherein said component includes an optical disk.

* * * * *

UNITED STATES PATENT AND TRADEMARK OFFICE
CERTIFICATE OF CORRECTION

PATENT NO.   :   4,762,384

DATED        :   August 9, 1988

INVENTOR(S)  :   John Hegarty and Raymond Wolfe

It is certified that error appears in the above-identified patent and that said Letters Patent is hereby corrected as shown below:

Column 6, line 1, "When" should read --With--.
Column 4, line 53, "sensor" should read --isolator--.
Column 21, line 26, "claim 2" should read --claim 1--.
Column 21, line 29, "claim 3" should read --claim 5--.
Column 22, line 5, "claim 1" should read --claim 2--.
Column 22, line 8, "claim 5" should read --claim 3--.

Signed and Sealed this

Thirtieth Day of October, 1990

Attest:

HARRY F. MANBECK, JR.

*Attesting Officer*    *Commissioner of Patents and Trademarks*